United States Patent
Sandel et al.

(10) Patent No.: US 9,699,617 B2
(45) Date of Patent: *Jul. 4, 2017

(54) SHARING LOCATION INFORMATION AMONG DEVICES

(71) Applicant: Apple Inc., Cupertino, CA (US)

(72) Inventors: Eran Sandel, Kiryat Ono (IL); Elad Harush, Tel-Aviv (IL); Roman Guy, Ashkelon (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,628

(22) Filed: Feb. 12, 2016

(65) Prior Publication Data

US 2016/0249177 A1 Aug. 25, 2016

Related U.S. Application Data

(63) Continuation of application No. 14/666,148, filed on Mar. 23, 2015, now Pat. No. 9,294,882, which is a
(Continued)

(51) Int. Cl.
| | |
|---|---|
| *H04W 24/00* | (2009.01) |
| *H04W 4/02* | (2009.01) |
| *G06F 3/048* | (2013.01) |
| *H04M 1/00* | (2006.01) |
| *G01C 21/34* | (2006.01) |
| *G01C 21/36* | (2006.01) |
| *G09B 29/10* | (2006.01) |
| *H04L 29/08* | (2006.01) |
| *H04W 64/00* | (2009.01) |
| *H04W 12/02* | (2009.01) |

(52) U.S. Cl.
CPC ........ *H04W 4/028* (2013.01); *G01C 21/3438* (2013.01); *G01C 21/36* (2013.01); *G01C 21/3667* (2013.01); *G06F 3/048* (2013.01); *G09B 29/106* (2013.01); *H04L 67/10* (2013.01); *H04L 67/306* (2013.01); *H04M 1/00* (2013.01); *H04W 4/027* (2013.01); *H04W 12/02* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 8,989,773 B2* | 3/2015 | Sandel | H04W 4/028 455/456.1 |
| 9,294,882 B2* | 3/2016 | Sandel | H04W 4/028 |

(Continued)

*Primary Examiner* — Erika Washington
(74) *Attorney, Agent, or Firm* — Fish & Richardson P.C.

(57) ABSTRACT

Methods, systems, apparatus, and computer program products that include, on a first device executing a first instance of a location application, receiving an indication to begin sharing data describing a path traveled by the first device, receiving location data describing the path traveled by the first device, the location data received from a location system of the first device, and the location data including a plurality of locations of the first device, and transmitting the location data in a form usable to enable a user interface of a second instance of a location application executing on a second device to indicate the path traveled by the first device.

24 Claims, 5 Drawing Sheets

Related U.S. Application Data continuation of application No. 13/752,604, filed on Jan. 29, 2013, now Pat. No. 8,989,773.

(56) References Cited

U.S. PATENT DOCUMENTS

| | | |
|---|---|---|
| 2005/0222756 A1 | 10/2005 | Davis et al. |
| 2009/0005018 A1 | 1/2009 | Forstall et al. |
| 2010/0274569 A1 | 10/2010 | Reudink |
| 2011/0118975 A1 | 5/2011 | Chen |
| 2012/0166531 A1 | 6/2012 | Sylvain |
| 2013/0303190 A1 | 11/2013 | Khan et al. |
| 2014/0062790 A1 | 3/2014 | Letz et al. |
| 2014/0099973 A1 | 4/2014 | Cecchini et al. |

* cited by examiner

SHARING LOCATION INFORMATION AMONG DEVICES

CROSS-REFERENCE TO RELATED APPLICATIONS

This application is a continuation of and claims priority to U.S. application Ser. No. 14/666,148, entitled "Sharing Location Information Among Devices, filed Mar. 23, 2015 and issued as U.S. Pat. No. 9,294,882, which is a continuation of and claims priority to U.S. application Ser. No. 13/752,604, entitled "Sharing Location Information Among Devices," filed on Jan. 29, 2013 and issued as U.S. Pat. No. 8,989,773, the entire contents of which are incorporated herein by reference.

TECHNICAL FIELD

The disclosure generally relates to sharing location information among devices.

BACKGROUND

Devices (e.g., mobile devices such a smartphones) can execute location applications that provide information about a location of the device. For example, the device could have a location system which determines a current position of the device and displays the position on a user interface of the device. The location application may also track the location of the device over time and display a path representing motion of the device.

SUMMARY

In one aspect, in general, a method includes on a first device executing a first instance of a location application, receiving an indication to begin sharing data describing a path traveled by the first device, receiving location data describing the path traveled by the first device, the location data received from a location system of the first device, and the location data including a plurality of locations of the first device, and transmitting the location data in a form usable to enable a user interface of a second instance of a location application executing on a second device to indicate the path traveled by the first device. Other aspects may include corresponding systems, apparatus, or computer program products.

Implementations of these aspects may include one or more of the following features. The method includes receiving a request for the second device to receive the data describing the path traveled by the first device, and receiving, at the first device, an authorization to transmit the location data to the second device. The method includes displaying on the first device a visual representation of the path traveled by the first device in the first instance of the location application, and wherein the transmitted location data is usable by the second device to display, in the second instance of a location application, a substantially identical visual representation of the path traveled by the first device. The method includes providing, on the user interface of the first instance of the location application, an indication that the second device has requested to receive the data describing the path traveled by the first device.

In another aspect, in general, a method includes on a first device executing a first instance of a location application, receiving an indication to receive shared data describing a path traveled by a second device, receiving location data describing the path traveled by the second device, the location data including a plurality of locations of the second device, and based on the received location data, indicating the path traveled by the second device in a user interface of the first instance of a location application executing on the first device. Other aspects may include corresponding systems, apparatus, or computer program products.

Implementations of these aspects may include one or more of the following features. The path traveled by the second device is indicated before at least some locations of the second device are received, and wherein the path traveled by the second device is subsequently updated in response to receiving at least some locations of the second device. Indicating the path traveled by the second device includes displaying, on the first device, a visual representation of the path traveled by the second device. Indicating the path traveled by the second device includes displaying, on the first device, a visual representation of directions for a user of the first device to follow the path. Indicating the path traveled by the second device includes providing, by the first device, a spoken word description of directions for a user of the first device to follow the path. The method includes indicating, on the first device, a spoken message generated based on a message provided by a user of the second device.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

A device in motion can record data about the path it travels and send the path data to another device. A user of the second device can then use the data to see where the first user traveled and/or travel the same path as did the first user.

For example, while the first user is driving a car, she could be running a maps application on the first device, and share the path she is travelling with the user of the second device while the second user is also driving a car. The second device could then display the path in an instance of the maps application running on the second device, or the second device could display directions the second user could use to follow the first user, or the second device could generate spoken word directions the second user could use to follow the first user, all in real time.

Figure 1:
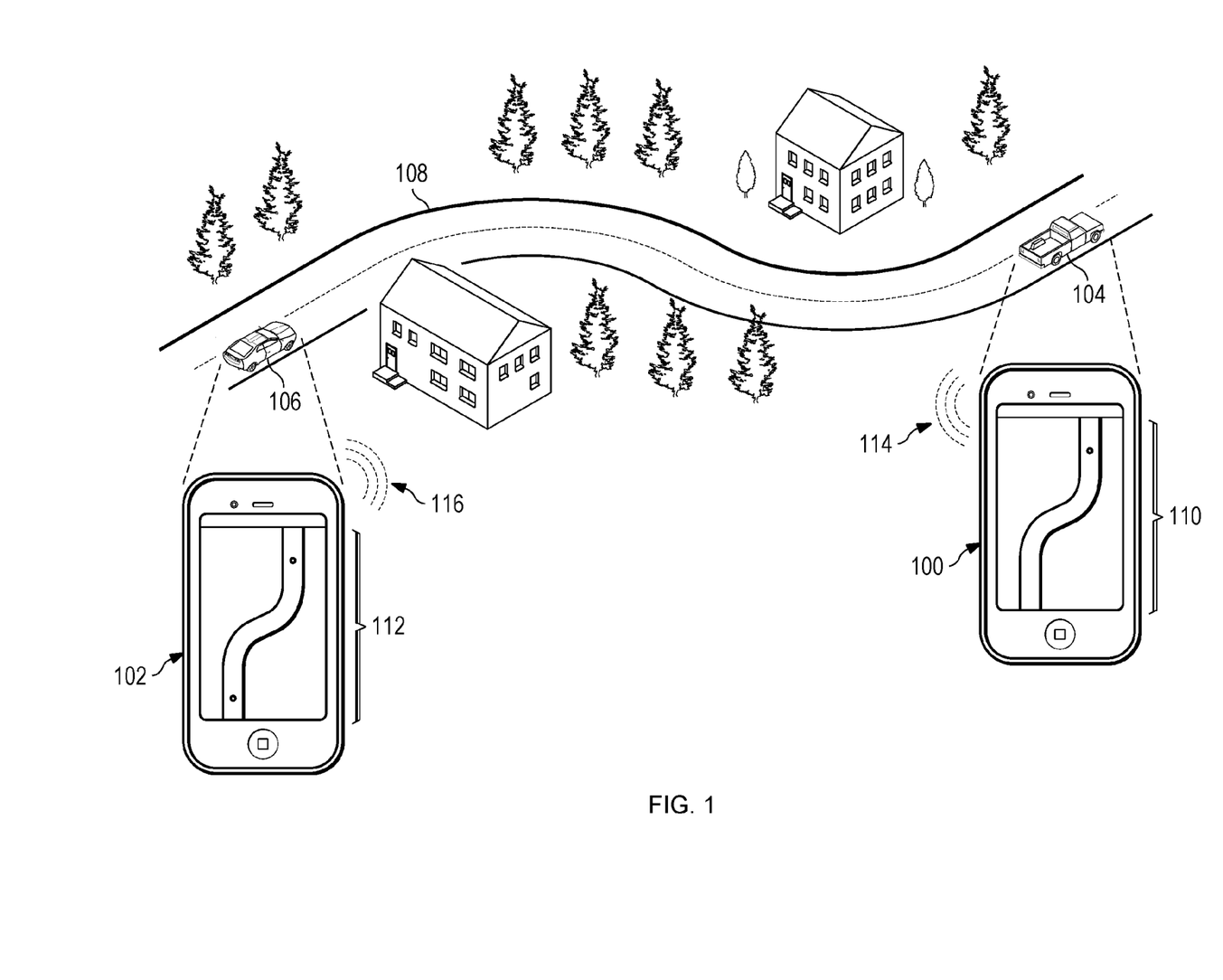
FIG. 1 shows a first device sharing location information with a second device.

FIG. 1 shows a first device 100 sharing location information with a second device 102. The first device 100 is contained within an automobile 104 and the second device 102 is contained within another automobile 106. While the first automobile 104 travels on a road, the first device 100 transmits location information to the second device 102. A user of the second device 102, e.g., a driver or passenger of the second automobile 106, can use the location information to guide the second automobile 106 along the same road to follow the first automobile 104.

In some implementations, the first device 100 may display location information 110 in the form of a map on a user interface of the first device 100. The first device 100 determines the location information 110, for example, using a location information facility of the first device 100. In some implementations, the location information facility is a Global Navigation Satellite System (GNSS) facility, for example, a GPS (Geographical Positioning System) facility. The location information facility may include a transmitter and receiver of location signals, e.g., GNSS signals. In some implementations, the first device 100 determines location information 110 using a location information facility other than a GNSS facility. For example, the first device may determine location information 110 using a wireless network facility, such as a wireless network transceiver. In some implementations, the wireless network transceiver can be used to determine a location of the first device 100 by collecting information about nearby wireless networks (e.g., 802.11 networks) of known location. In some implementations, other location information facilities can be used to determine a location of the first device 100. In some implementations, a location information facility external to the first device 100 is used (e.g., an external device that communicates a location to the first device 100). In some implementations, the location information can be entered manually by a user of the first device 100.

The second device 102 displays location information 112 based on the location information 110 determined by the first device 100. For example, the second device 102 may display the location information 112 in the form of a map that includes a current location of the first device 100.

In use, the first device 100 transmits 114 location information which is received 116 by the second device 102. The second device 102 uses the information transmitted by the first device 100 to display location information 112 that includes a location of the first device 100. The information can be transmitted and received using a communication medium usable by the devices 100, 102. For example, the first device 100 may transmit 114 the location information using a wireless communications facility such as a wireless communications transceiver. The information may be transmitted using a wireless communications transceiver that communicates on a mobile communications network (e.g., 3G, LTE, WiMAX, etc.), a wireless LAN (e.g., 802.11), or another kind of wireless network. When a mobile communications network or a wireless network is used, an intermediary may receive the location information from the first device 100 which then re-transmits the location information to the second device 102. For example, the intermediary may be a server (e.g., a "cloud" server accessible to both the first device 100 and the second device 102) that receives and re-transmits the location information.

In some implementations, the wireless communications facility operates using a point-to-point communications protocol that allows the first device 100 to transmit 114 location information directly to a wireless communications transceiver of the second device 102. For example, the point-to-point communications protocol could be a Bluetooth protocol.

In some implementations, the location information 112 also includes a path followed by the first device 100. For example, the location information displayed by the second device 102 may include a starting location of the first device 100 and may include graphical elements (e.g., lines on a map) representing the path followed by the first device 100. A user of the second device 102 could use this information to not only identify a current location of the first device 100 but also re-create the path followed by the first device 100.

In some implementations, the first device 100 does not display location information 110, and the location information is determined on the first device 100 with a primary purpose of transmission to the second device 102 (e.g., for display on the second device 102).

In this example, the devices 100, 102 are shown as mobile devices (e.g., smartphones). Either of the devices 100, 102 could be any kind of electronic device, e.g., a laptop computer, a tablet computer, a wrist-mounted computer, a personal digital assistant, a built-in navigation system (e.g., built into either or both of the automobiles 104, 106), or any other kind of device capable of transmitting and receiving information. The devices 100, 102 need not be devices of the same type; for example, one device 100 could be a smartphone and the other device 102 could be a laptop computer.

In this example, the devices 100, 102 are shown as each contained within automobiles 104, 106. However, in some examples, either or both of the devices 100, 102 could be carried by another type of vehicle (e.g., bicycle, motorcycle, jet-ski, helicopter, etc.). Either or both of the devices 100, 102 could be carried by a human being on foot, or an animal, or a robot.

The location information represents a path 108 (e.g., a path corresponding to a road or other geographical feature) that the first device 100 is traveling. Data describing the path 108 may be recorded by the first device 100. For example, the first device 100 may record data describing multiple locations (e.g., positions) of the first device 100 over time, and the data describing the path 108 includes the data describing the multiple locations over time.

In some examples, the first device 100 transmits location information to multiple other receiving devices (e.g., the second device 102 as well as other devices). In some implementations, the first device 100 may have a "broadcast" mode in which the location of the first device 100 is shared with any number of other devices. The first device 100 may make this information publically available, e.g., in a database or other resource available to many other users of mobile devices. In this example, the first device 100 may not receive any communications from other devices and may not be notified that other devices are receiving location information. The database or other resource may also store information about the location of the first device 100 over time for later retrieval by other users.

Figure 2A:
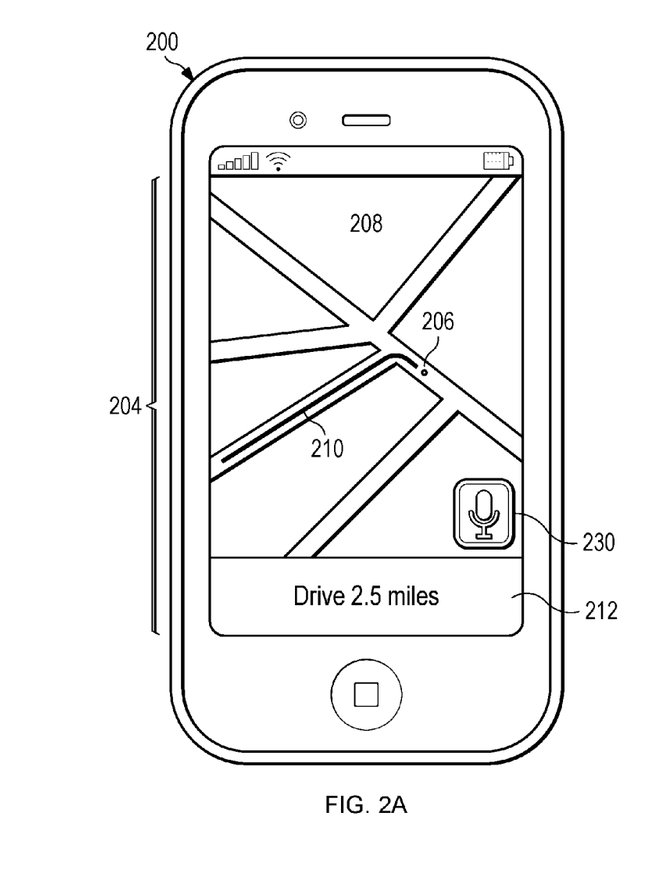
FIGS. 2A and 2B are views of location information user interfaces of devices.
Figure 2B:
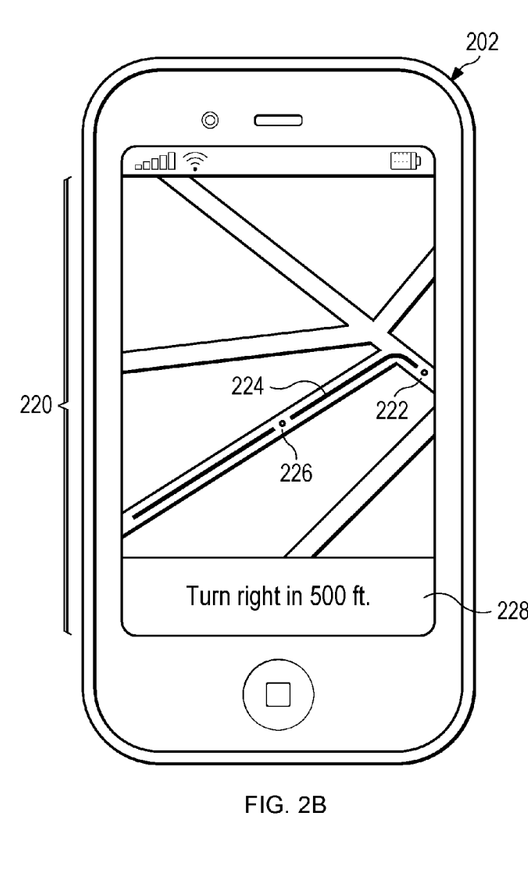

FIGS. 2A and 2B are views of location information user interfaces of devices. FIG. 2A shows a first device 200 and FIG. 2B shows a second device 202. For example the first device 200 could be an example of the first device 100 shown in FIG. 1, and the second device 202 could be an example of the second device 102 shown in FIG. 1. The first device 200 displays a user interface 204 representing a current location 206 of the first device 200. The current location 206 may be displayed in the context of a map 208 of the region surrounding the first device 200. The map 208 may include streets, landmarks, geographical features, etc. The map 208 can also display a visual representation of a path 210 representing the route that the first device 200 has taken (e.g., representing previous current locations of the first device 200). In some implementations, the user interface 204 has been configured to indicate directions 212 to a specified destination (e.g., a destination specified by a user of the first device 200). The directions 212 could be indicated as textual directions, or spoken-word directions (using an audio output facility of the first device 200), or in another manner.

The second device 202 displays a user interface 220 representing location information received from the first device 200 (e.g., received in the form of data transmitted using a mobile communications network or other communications medium). In some examples, the user interface 220 could display a current location 222 of the first device 200. The user interface 220 may also display a visual representation of a path 224 traveled by the first device 200 (e.g., representing previous locations of the first device 200).

The path 224 may be displayed in the user interface 220 upon the initiation of sharing of location information, such that locations of the first device 200 recorded prior to the initiation of the sharing can be displayed on a user interface 220 of the second device. For example, when the first device 200 begins transmitting location information, the first device 200 may have already completed a portion of a journey. The journey could be, e.g., a journey from a start destination to an end destination each specified by a user of the first device 200. For example, a journey is sometimes specified in connection with functionality for providing directions from a start destination to an end destination. A portion of a journey already in progress (e.g., previous locations of the first device 200 recorded by the first device 200) can be transmitted to the second device 202 and a visual representation of the portion of the journey (e.g., a path representing the portion of the journey) can be displayed on the user interface 220 of the second device. As the first device 200 records further locations (e.g., continues the journey) then the locations can be transmitted to the second device 202 and the path 224 displayed on the user interface 220 of the second device 202 can be subsequently updated.

In some examples, the visual representation of the path 224 displayed on the second device 202 may be substantially identical to the visual representation of the path 210 displayed on the first device 200. For example, the path 224 displayed on the second device 202 may be shown with the same shapes and colors used to represent the path 210 displayed on the first device 200. The current location 222 and the path 224 may be displayed on the second device 202 simultaneous with the display of the current location 206 and path 210 displayed on the first device 200. In some examples, the user interface 220 may display a current location 226 of the second device 202.

In some examples, the user interface 220 of the second device can be configured to display exactly the same view as shown on the user interface 204 of the first device 200. This may take the form of a "mirroring" mode in which the second device 202 receives information from the first device 200 usable to replicate the view shown on the user interface 204 of the first device 200. For example, if the second device 202 has entered the "mirroring" mode, the first device 200 may transmit information to the second device 202 representing a current zoom level of the map 208, boundaries of the map 208 as displayed on the first device 200, and other data describing what is displayed on the first device 200. In some examples, the directions 212 indicated in the user interface 204 of the first device 200 could also be indicated in the user interface 220 of the second device 202.

In some implementations, the user interface 220 of the second device 202 can be configured to indicate directions 228 to the current location 222 of the first device 200. In some examples, the directions 228 indicate a route to follow which corresponds to the path 224 traveled by the first device 200. In some implementations, the directions 228 are generated by the second device 202 only based on the current location 222 of the first device 200 and may not correspond to the path 224 traveled by the first device 200 (e.g., if the first device 200 followed a meandering path, had to backtrack, or otherwise followed an inefficient route). The directions 228 could be indicated as textual directions, or spoken-word directions (using an audio output facility of the first device 200), or in another manner.

In some implementations, a user of the first device 200 can send a message to a user of the second device 202. For example, the user interface 204 displayed on the first device 200 could provide functionality for the user of the first device 200 to enter a textual message or spoken-word message which is then transmitted to the second device 202. In some examples, users of the first device 200 and the second device 202 may be operating motor vehicles, and so those users will each favor a spoken-word message for safety reasons (e.g., to avoid operating their respective devices while also operating controls of the motor vehicle). For example, the user interface 204 of the first device 200 could include a button 230 which, when invoked (e.g., pressed, tapped, or invoked by a spoken-word command), records a message spoken by the user of the first device 200. In use, the message can include, for example, information helpful to the user of the second device 202 in navigation (e.g., "After the bridge I will be turning right onto Beacon Street").

In some examples, a recording of the message could be transmitted to the second device 202. In some examples, the spoken-word message could be converted to textual data by a voice recognition mechanism. The textual data could then be transmitted to the second device 202 and displayed in the user interface 220 of the second device as text or converted to audio (e.g., by a text-to-speech engine) or both. In some examples, the user interface 220 of the second device 202 enables a user of the second device 202 to send a message to a user of the first device 200. In some examples, multiple devices receive location information from the first device 200, and the message recorded by the user of the first device 200 can be sent to multiple devices.

In some implementations, the user interface 204 on the first device 200 and the user interface 220 on the second device 202 are each displayed in connection with the execution of a location application. A location application is any software that provides facilities for determining or displaying location information. For example, the user interface 204 on the first device 200 could be generated by a location application executing on the first device 200, and the user interface 220 on the second device 202 could be generated by a location application executing on the second device 202. An application executing on a device can be said to be running on the device, and a particular execution of an application is sometimes called an "instance." In some implementations, the location application running on the first device may be the same application (e.g., the same program code) as the location application running on the second device. In some implementations, the location application running on the first device may be a different application as the location application running on the second device.

Figure 3A:
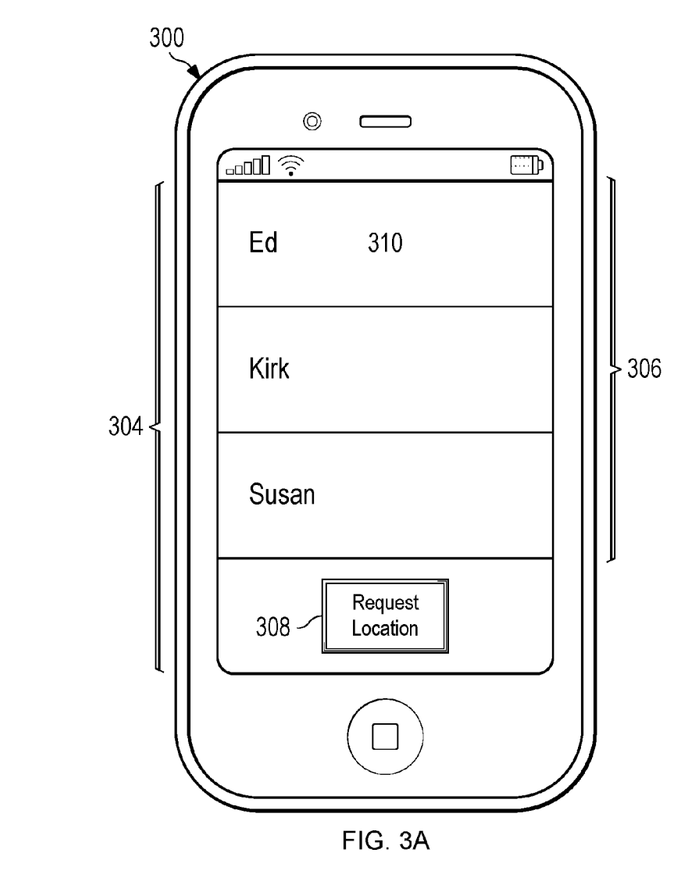
FIGS. 3A and 3B are views of authorization user interfaces of devices.
Figure 3B:
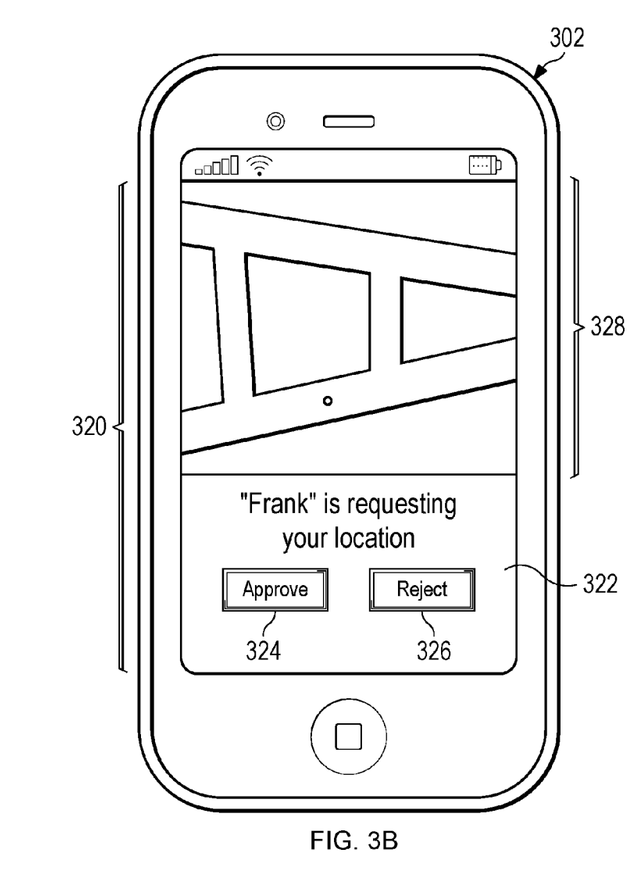

FIGS. 3A and 3B are views of authorization user interfaces of devices. FIG. 3A shows a first device 300 and FIG. 3B shows a second device 302. For example the first device 300 could be an example of the second device 102 shown in FIG. 1, and the second device 302 could be an example of the first device 100 shown in FIG. 1.

The first device 300 displays a user interface 304 that enables a user of the first device 300 to request location information from another device. The user interface 304 displays a list 306 of users available to a user of the first device 300. A user of the first device 300 selects a user in the list 306 of users and presses a "request location" button 308. The first device 300 then sends a request to another device, which operated by the identified user (e.g., the second device 302) for that other device to share location information with the first device 300.

In some implementations, the list 306 of users could be a list of users associated with a user profile or user account of a user of the first device 300. For example, the ability to share location data may be enabled by a service external to the first device 300, e.g., a "cloud" service available using a network such as the Internet. The "cloud" service may enable users to establish user profiles or user accounts. Each user who has established a user profile or user account may configure the profile or account to include information about a device operated by the user, so that the "cloud" service can identify devices operated by that user when location information is requested of the user. In some examples, a user of the "cloud" service may also establish a list (e.g., the list 306 shown in the user interface 304) of other users of the "cloud" service from whom that user may wish to request location information. When a user of the first device 300 selects a user 310 in the list 306 of users and presses the "request location" button 308, the first device 300 may contact the "cloud" service (e.g., a server made available on the Internet by the "cloud" service). The "cloud" service can determine a device currently associated with the user 310 on the list 306 of users (e.g., by receiving regular updates from the user on the list 306 of users about which device the user is using) and make a request for location information from the second device 302 on behalf of the first device 300.

In some examples, the list 306 of users could be a "contacts list" available on the first device 300. The "contacts list" may be a list of contacts for whom a user of the first device 300 has entered contact information, e.g., name, email address, mobile phone number, etc. When a user of the first device 300 selects a user 310 in the list 306 of users and presses the "request location" button 308, the first device 300 may use contact information associated with the selected user 310 to transmit a request to the selected user. For example, the first device 300 may transmit an email message or SMS (short message service) message to the email address or mobile phone number associated with the selected user 310 making a request to receive location information from a device (e.g., the second device 302) operated by the selected user 310. In some implementations, the first device 300 can use a mobile phone number to identify the second device 302 and determine a manner of communicating with the second device 302 based on the mobile telephone number. In some examples, the first device 300 could access a table of mobile phone numbers (e.g., a table available on the Internet or made available by a "cloud" service that stores the table on a publicly accessible server) and retrieve identifying information for the second device 302 based on the mobile phone number. For example, the table could correlate mobile phone numbers to IP (Internet Protocol) addresses, and the first device 300 could use the retrieved IP address to send a communication to the second device 302 over the Internet (or other network).

When the first device 300 communicates a request to receive location information from the second device 302, the second device 302 may enable a user of the second device 302 (e.g., the selected user 310 shown in FIG. 3A) to authorize the request. For example, as shown in FIG. 3B, the second device 302 can display a user interface 320 indicating that another user 322 (e.g., a user of the first device 300) has made a request to receive location information from the second device 302. The user interface 320 includes buttons 324, 326 that enable the user of the second device 302 to approve or reject the request. In this way, the user of the second device 302 may keep his or her location information private if he or she chooses.

In some implementations, the user interface 320 displayed on the second device 302 can include location information 328 from the first device 300, for example, information representing a current location of the first device 300. In some examples, when the first device 300 transmits a request to receive location information from the second device 302, the first device 300 can also transmit location information such as the current location of the first device 300. The second device 302 can then display the location information 328 in the user interface 320 when the second device 302 enables a user of the second device 302 to approve the request. In this way, the user of the second device 302 can know the location of the first device 300 before approving the request. For example, the user of the second device 302 may choose to only share location information with users who are physically nearby.

If the user of the second device 302 chooses to approve the request to receive location information, the second device 302 will then transmit location information (e.g., previous and current locations of the second device) to the first device 300. The first device 300 can then display the location information, e.g., in the form of the user interface 220 shown in FIG. 2B.

Once the sharing of location information has been established, an user interface is displayed on the first device 300 showing location information (e.g., current location and a path traveled) of the second device 302. For example, the user interface that is displayed could be the user interface 220 shown in FIG. 2A.

In some implementations, a user of the second device 302 could choose to share location information with a user of the first device 300 but selecting the user of the first device 300 from a list of users displayed on the second device 302 (similar to the list 306 of users shown in FIG. 3A).

Figure 4:
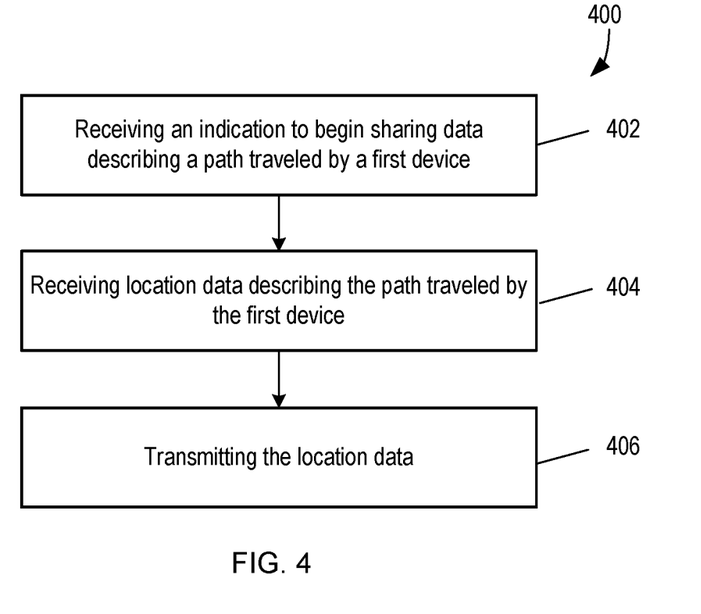
FIG. 4 is a flowchart of an exemplary process of sharing location information.

FIG. 4 is a flowchart of an exemplary process 400 of sharing location information. The process 400 can be performed, for example, by the first device 100 shown in FIG. 1.

An indication to begin sharing data describing a path traveled by a first device is received (402). The first device executes a first instance of a location application. In some implementations, an indication is provided, on the user interface of the first instance of the location application, that the second device has requested to receive the data describing the path traveled by the first device.

Location data describing the path traveled by the first device is received (404). The location data is received from a location system of the first device, and the location data includes a plurality of locations of the first device. For example, the location system could be a GNSS system.

The location data is transmitted (406) in a form usable to enable a user interface of a second instance of a location application executing on a second device to indicate the path traveled by the first device. For example, the first device could display a visual representation of the path traveled by the first device in the first instance of the location application, and the transmitted location data can be usable by the second device to display, in a second instance of a location application, a substantially identical visual representation of the path traveled by the first device. The location data could be transmitted to a device other than the second device.

In some implementations, a request is received from the second device to receive the data describing the path traveled by the first device, and an authorization to transmit the location data to the second device is received at the first device. For example, the authorization can be received at a user interface of the first device (e.g, from a user of the first device).

Figure 5:
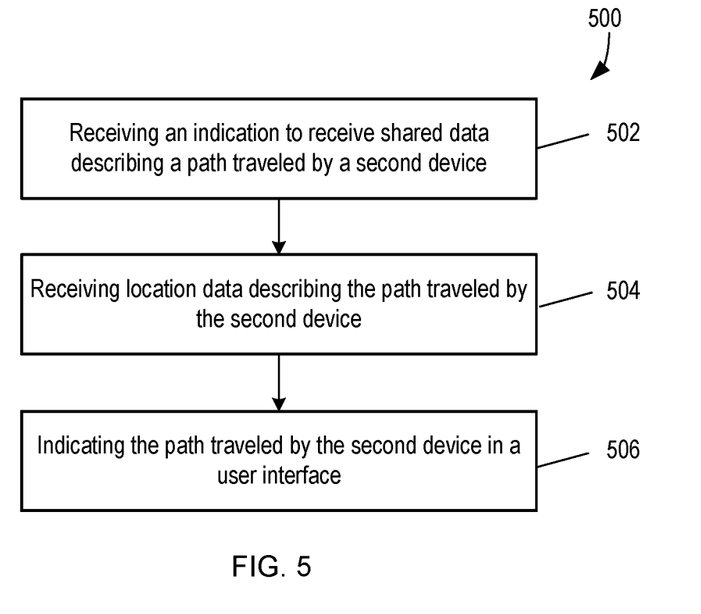
FIG. 5 is a flowchart of another exemplary process of indicating shared location information

FIG. 5 is a flowchart of another exemplary process 500 of indicating shared location information. The process 500 can be performed, for example, by the second device 102 shown in FIG. 1.

An indication is received (502), on a first device executing a first instance of a location application, to receive shared data describing a path traveled by a second device.

Location data describing the path traveled by the second device is received (504) by the first device, the location data including a plurality of locations of the second device.

Based on the received location data, the path traveled by the second device is indicated (506) in a user interface of the first instance of the location application executing on the first device. In some implementations, the path traveled by the second device is displayed on the first device as a visual representation of the path traveled by the second device. In some implementations, the path traveled by the second device is displayed on the first device as a visual representation of the directions for a user of the first device to follow the path. In some implementations, a spoken word description of directions for a user of the first device to follow the path is provided. In some implementations, a spoken message generated based on a message provided by a user of the second device is indicated on the first device. In some implementations, the path traveled by the second device is indicated before at least some locations of the second device are received, and the path traveled by the second device is subsequently updated in response to receiving at least some locations of the second device.

This disclosure describes various Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 6:
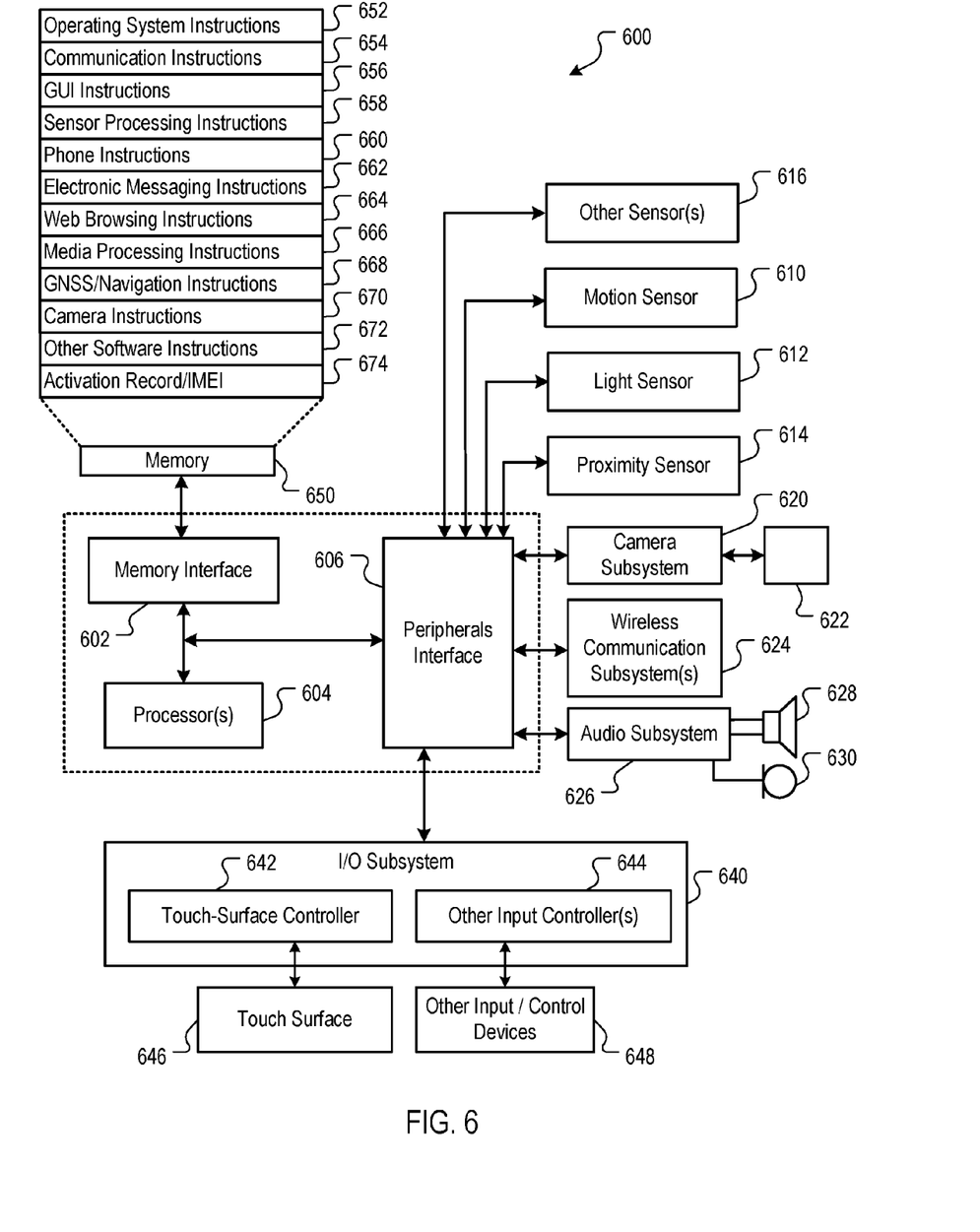
FIG. 6 is a block diagram of an example computing device that can implement the features and processes of FIGS. 1-5.

FIG. 6 is a block diagram of an example computing device 600 that can implement the features and processes of FIGS. 1-5. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voiceprinting and voice authentication, as described above with reference to FIGS. 1-5, In some implementations, the microphone 630 facilitates voice-enabled functions, such as speech-to-text, speaker recognition, voice replication, digital recording, and telephony functions. The audio subsystem 626 can be configured to facilitate processing voice commands, voiceprinting and voice authentication. In some implementations, audio recorded by the audio subsystem 626 is transmitted to an external resource for processing. For example, voice commands recorded by the audio subsystem 626 may be transmitted to a network resource such as a network server which performs voice recognition on the voice commands.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™. The computing device 600 can, therefore, include a 36-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement the security lockout and voice authentication features as described with reference to FIGS. 1-5. Operating system 352 can implement the voiceprint and voice authentication features described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store other software instructions 672 to facilitate other processes and functions, such as the security and/or authentication processes and functions as described with reference to FIGS. 1-5. For example, the software instructions can include instructions for performing voice authentication on a per application or per feature basis and for allowing a user to configure authentication requirements of each application or feature available on device 100.

The memory 650 can also store other software instructions (not shown), such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) 674 or similar hardware identifier can also be stored in memory 650.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

What is claimed is:

1. A method comprising:
   on a first device executing a first instance of a location application:
   displaying a location user interface to a first user of the first device, the location user interface including a representation of a location of the first device;
   generating first location data representing a current location of the first device;
   receiving a request from a second device, the second device associated with a second user, for the first device to share location data with the second device, the request including second location data representing a location of the second device;
   displaying, in response to the request, in an authorization user interface, a representation of the location of the second device,
   the authorization user interface comprising a user interface that indicates a request to receive location data from the first device;
   receiving input representing an authorization to send location data from the first device; and
   transmitting, in response to the authorization, the first location data representing a current location of the first device.

2. The method of claim 1, comprising transmitting, in response to the authorization, destination data describing a destination specified by the first user of the first device.

3. The method of claim 2, comprising transmitting data usable by the second device to indicate a path traveled by the first device in a user interface of a second instance of the location application executing on the second device.

4. The method of claim 3, comprising transmitting data usable by the second device to indicate directions along a path to the specified destination.

5. The method of claim 1, wherein the second device is identified as associated with the second user based on data received from a cloud service.

6. The method of claim 1, wherein the first user was identified by the second user in a user interface of the second device before the request was transmitted.

7. The method of claim 1, comprising displaying, in the authorization user interface, data representing an identity of the second user.

8. The method of claim 1, wherein the location user interface includes the authorization user interface.

9. The method of claim 1, wherein the location user interface is distinct from the authorization user interface.

10. A computer readable storage device encoded with instructions that, when executed by a first device executing a first instance of a location application, cause the first device to carry out operations comprising:
displaying a location user interface to a first user of the first device, the location user interface including a representation of a location of the first device;
generating first location data representing a current location of the first device;
receiving a request from a second device, the second device associated with a second user, for the first device to share location data with the second device, the request including second location data representing a location of the second device;
displaying, in response to the request, in an authorization user interface, a representation of the location of the second device, the authorization user interface comprising a user interface that indicates a request to receive location data from the first device;
receiving input representing an authorization to send location data from the first device; and
transmitting, in response to the authorization, the first location data representing a current location of the first device.

11. The computer readable storage device of claim 10, the operations comprising transmitting, in response to the authorization, destination data describing a destination specified by the second user of the second device.

12. The computer readable storage device of claim 11, the operations comprising transmitting data usable by the second device to indicate a path traveled by the first device in a user interface of a second instance of the location application executing on the second device.

13. The computer readable storage device of claim 11, the operations comprising transmitting data usable by the second device to indicate directions along a path to the specified destination.

14. The computer readable storage device of claim 10, wherein the second device is identified as associated with the second user based on data received from a cloud service.

15. The computer readable storage device of claim 10, wherein the first user was identified by the second user in a user interface of the second device before the request was transmitted.

16. The computer readable storage device of claim 10, comprising displaying, in the authorization user interface, data representing an identity of the second user.

17. The computer readable storage device of claim 10, wherein the location user interface includes the authorization user interface.

18. The computer readable storage device of claim 10, wherein the location user interface is distinct from the authorization user interface.

19. A system comprising:
a location system configured to determine a location of a first device; and
a processor configured for, while a first instance of a location application is executing on the first device:
displaying a location user interface to a first user of the first device, the location user interface including a representation of a location of the first device;
generating first location data representing a current location of the first device;
receiving a request from a second device, the second device associated with a second user, for the first device to share location data with the second device, the request including second location data representing a location of the second device;
displaying, in response to the request, in an authorization user interface, a representation of the location of the second device, the authorization user interface comprising a user interface that indicates a request to receive location data from the first device;
receiving input representing an authorization to send location data from the first device; and
transmitting, in response to the authorization, the first location data representing a current location of the first device.

20. The system of claim 19, the processor configured for transmitting, in response to the authorization, destination data describing a destination specified by the first user of the first device.

21. The system of claim 20, the processor configured for transmitting data usable by the second device to indicate a path traveled by the second device in a user interface of a second instance of the location application executing on the second device.

22. The system of claim 21, the processor configured for transmitting data usable by the second device to indicate directions along a path to the specified destination.

23. The system of claim 19, wherein the second device is identified as associated with the second user based on data received from a cloud service.

24. The system of claim 19, wherein the first user was identified by the second user in a user interface of the second device before the request was transmitted.

* * * * *

UNITED STATES PATENT AND TRADEMARK OFFICE
CERTIFICATE OF CORRECTION

PATENT NO. : 9,699,617 B2
APPLICATION NO. : 15/042628
DATED : July 4, 2017
INVENTOR(S) : Eran Sandel, Elad Harush and Roman Guy It is certified that error appears in the above-identified patent and that said Letters Patent is hereby corrected as shown below:

In the Specification

Column 1, Line 9, delete "Devices," and insert -- Devices," --; and

In the Claims

Column 13, Line 42, delete "claim 11," and insert -- claim 12, --.

Signed and Sealed this
Twenty-sixth Day of February, 2019

Andrei Iancu
*Director of the United States Patent and Trademark Office*